3,078,306
Patented Feb. 19, 1963

3,078,306
PROCESS FOR THE PRODUCTION OF ALPHA-CHLOROXIMES AND THEIR HYDROCHLORIDES
Otto von Schickh and Horst Metzger, Ludwigshafen (Rhine), Germany, assignors to Badische Anilin- & Soda-Fabrik Aktiengesellschaft, Ludwigshafen (Rhine), Germany
No Drawing. Filed Apr. 14, 1959, Ser. No. 806,222
Claims priority, application Germany Apr. 24, 1958
3 Claims. (Cl. 260—566)

This invention relates to an improved process for the production of alpha-chloroximes. More specifically, the invention relates to a process for manufacturing alpha-chloroximes via their hydrochlorides, the said hydrochlorides being new substances.

It is known that nitrosyl chloride can be added on to olefines. Dimeric chlornitroso compounds are thereby obtained in general. The addition of nitrosyl chloride to olefines takes place the more readily, the more extensive is the substitution of the carbon atoms at the double linkage. The yields by the addition are in general bad and the reaction products obtained are non-uniform. Thus by the addition of nitrosyl chloride to olefines which bear at the double linkage still at least one hydrogen atom, there are formed, besides the monomeric or dimeric 1-nitroso-2-chlor compounds, also the isomeric 1-oximino-2-chlor compounds, 1-nitroso-1,2-dichlor compounds and also 1,2-dichlor compounds as well as oxidation products. When compounds are used which produce nitrosyl chloride in situ, as for example alkylnitrites and hydrochloric acid, or acetyl chloride, the products obtained are also not uniform. Alpha-chlorketones have also already been reacted with hydroxylammonium salts. This method has the disadvantage, however, that the alpha-chloroximes cannot be isolated pure from the reaction mixture, especially because these themselves react with hydroxylamine.

We have now found that alpha-chloroximes are obtained in a simple way and in good yields by reacting a compound having an olefinic double linkage which bears at least one hydrogen atom on one of the carbon atoms belonging to the double linkage, with nitrosyl chloride in the presence of hydrogen chloride and converting the alpha-chloroxime hydrochloride formed into the free alpha-chloroxime.

The mono-olefines or their substitution products which are used as initial material have the general formula:

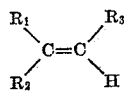

in which $R_1$, $R_2$ and $R_3$ represent hydrogen or an alkyl, cycloalkyl, aralkyl, aryl, alkoxy or acylated hydroxyalkyl radical, or $R_1$ and $R_2$ or $R_1$ and $R_3$ are closed by way of methylene groups to a cycloaliphatic ring.

There are used as initial materials especially compounds of the above formula in which $R_1$, $R_2$ and/or $R_3$ are hydrogen or alkyl radicals with 1 to 16 carbon atoms, cycloalkyl radicals with 5 to 8 carbon atoms, aryl radicals, such as phenyl, acylated hydroxyalkyl radicals, such as acylated hydroxymethyl groups or acylated hydroxyethyl groups, or compounds in which $R_1$ and $R_2$ are closed by 4 to 7 methylene groups to a cycloaliphatic ring or in which $R_1$ and $R_3$ are closed by 3 to 6 methylene groups to a cycloaliphatic ring.

For example the following compounds with an olefinic double linkage may be reacted according to this invention: propylene, trimethylethylene, octene-(1), octene-(2), tridecene-(1), cyclopentene, cyclohexene, methylcyclohexene, methylenecyclohexane, limonene, cycloheptene, cyclo-octene, styrene, para-chlorstyrene, styryl alcohol acetate, cinnamyl alcohol acetate and cinnamyl alcohol benzyl ether.

By the process according to this invention there are obtained as intermediate products, the hydrochlorides of the alphachloroximes which may contain more than one mol of hydrogen chloride per mol of alpha-chloroxime. These new substances have the general formula:

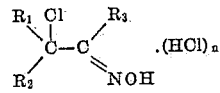

in which $R_1$, $R_2$ and $R_3$ represent hydrogen or alkyl, cycloalkyl, aralkyl, aryl, alkoxy or acylated hydroxalkyl radicals or $R_1$ and $R_2$ or $R_1$ and $R_3$ are closed by way of methylene groups to a cycloaliphatic ring and $n$ is a number between 1 and 2 inclusive.

By the addition of the nitrosyl chloride, the chlorine atom in general becomes attached to the carbon atom having the least hydrogen.

The reaction can be carried out at lowered, room or moderately elevated temperature, in general at a temperature of from about $-50°$ C. to about $+50°$ C., advantageously at $-20°$ to $+20°$ C.

The procedure in carrying out the process is in general that gaseous or liquid nitrosyl chloride is allowed to act on a solution, possibly saturated with gaseous hydrogen chloride, of the olefine in an inert solvent, and simultaneously with the nitrosyl chloride an amount of hydrogen chloride is led in equal to the amount absorbed by the reaction mixture. Either or both the gaseous nitrosyl chloride or/and the hydrogen chloride may be diluted by inert gases, as for example nitrogen. The nitrosyl chloride and the olefine used are preferably reacted in about equimolecular amounts, and at least 1 mol of hydrogen chloride is added in all for each mol of olefine. It is possible to work with an excess of hydrogen chloride, for example up to 3 mols, without disadvantage.

The alpha-chloroxime hydrochlorides are usually formed in a crystalline or liquid form which permits a simple separation of the very pure substances. If the alpha-chloroxime hydrochloride remains in solution, it can be isolated by precipitation with a suitable solvent, for example a solvent in which the oxime hydrochloride is insoluble or soluble only with difficulty, for example an aliphatic hydrocarbon, or after removal of the solvent.

Suitable solvents for the reaction are for example chlorohydrocarbons, such as carbon tetrachloride, chloroform or tetrachlorethane, aliphatic and cycloaliphatic hydrocarbons, as for example pentane, petroleum ether or cyclohexane, but also other inert solvents, as for example ether, benzene or toluene.

The reaction may however also be carried out without solvents.

The process can be carried out discontinuously or continuously.

The alpha-chloroximes may be set free from the hydrochlorides in manner known per se or also without the use of basic-reacting compounds. We have further found that the combined hydrogen chloride can even be removed by pumping off or by a simple water treatment of the hydrochlorides. Both methods may however be used.

By reason of the great reactivity of the chloro- and oximino groups, alpha-chloroximes are capable of a great variety of conversions and are therefore valuable intermediate products, for example for the production of pesticides or pharmaceutical products. It is also possible to obtain alpha-monochlorketones, which often are accessible only with difficulty, by saponification of the alpha-chloroximes. The hydrochlorides of the alpha-chloroximes may also be used for the same purposes directly.

The following examples will further illustrate this invention but the invention is not restricted to these examples. The parts specified in the examples are parts by weight.

*Example 1*

Into a solution of 22 parts of cyclo-octene in 75 parts of chloroform which has been saturated with hydrogen chloride there are introduced at −15° C. while stirring 13.1 parts of gaseous nitrosyl chloride, and at the same time an amount of gaseous hydrogen chloride is led into the reaction mixture equal to that which is absorbed. When the reaction has ended, the red-brown colored solution is freed from solvent by removal under reduced pressure and the 1-oximino-2-chlor-cyclo-octane hydrochloride remaining as a yellow colored viscous oil is triturated with a little water. After a short time the mass solidifies to pale yellow colored crystals of 1-oximino-2-chlor-cyclo-octane which are filtered off by suction and dried in the air. 31 parts of the melting point 100° C. are obtained, that is 88% of the theory with reference to cyclo-octene. After recrystallization from petroleum ether, the melting point has risen to 102° C.

*Example 2*

Into a solution, saturated with hydrogen chloride, of 22 parts of cyclo-octene in 40 parts of cyclohexane there are led while stirring at +15° to 20° C., 13.1 parts of nitrosyl chloride and at the same time such an amount of hydrogen chloride that the reeaction mixture constantly remains saturated with hydrogen chloride. After a short time, the 1-oximino-2-chlor-cyclo-octane hydrochloride separates out in crystalline form. After the reaction has ended, the crystals are filtered off by suction from the pale yellow colored mother liquor and dried. The compound obtained is triturated with a little water, and an oil forms which, however, solidifies in crystalline form after a short time. By filtration by suction and drying, 30.2 parts of 1-oximino-2-chlor-cyclo-octane of the melting point 99° C. are obtained, that is 86% of the theory with reference to cyclo-octene.

*Example 3*

Into a solution, saturated with hydrogen chloride, of 16.4 parts of cyclohexene in 75 parts of chloroform there are led, while stirring at −15° C., 13 parts of nitrosyl chloride and such an amount of hydrogen chloride that the reaction mixture is constantly saturated with hydrogen chloride. After the end of the reaction, the orange-red solution is freed from the solvent by removal under reduced pressure. The residue, which is liquid at first, solidifies very quickly to pale yellow colored crystals. 33 parts of 1-oximino-2-chlor-cyclohexane hydrochloride of the melting point 95° C. to 97° C. are obtained, that is 90% of the theory with reference to cyclohexene. Analytical determination of chlorine gives the following values: Calculated: 38.55. Found: 38.1.

After trituration with 50 parts of water, whereupon the compound at first liquefies and then solidifies again very quickly in crystalline form, 25.2 parts of 1-oximino-2-chlor-cyclohexane of the melting point 82° C. are obtained, that is 85% of the theory with reference to cyclohexene. When the compound is recrystallized from petroleum ether, the melting point rises to 85° C.

The 1-oximino-2-chlor-cyclohexane hydrochloride can be freed from the greater part of the hydrogen chloride and converted into the free oxime of the melting point 79° C. by pumping off the hydrogen chloride at 25° C. for several hours. Cl calculated: 24.03. Cl found: 25.1.

If an analogous procedure is followed in the nitrosylation, but without the addition of hydrogen chloride, the reaction mixture becomes blue-green in color. At the same time disengagement of gas can be observed which indicates an oxidation. After distilling off the solvent, a blue-green oil remains from which a crystalline compound cannot be isolated. If an attempt is made to distil the residue, a vigorous decomposition occurs.

*Example 4*

To a solution, saturated with hydrogen chloride, of 16.4 parts of cyclohexene in 40 parts of cyclohexane there are added dropwise at 0° C. while stirring, 13 parts of liquid nitrosyl chloride and at the same time an amount of hydrogen chloride is led in equal to that which is absorbed by the reaction mixture. During the reaction, the 1-oximino-2-chlor-cyclohexane hydrochloride at first separates as an oil which collects at the bottom of the reaction vessel and which solidifies in crystalline form by stirring or in a vacuum exsiccator. The crystalline product has the melting point 94° C.

By stirring the compound with a little water, 22.2 parts of 1-oximino-2-chlor-cyclohexane of the melting point 79° C. are obtained, that is 75% of the theory.

If the reaction of the cyclohexene with nitrosyl chloride is carried out at room temperature, the alpha-chloroxime hydrochloride formed is precipitated immediately in crystalline form.

*Example 5*

Into a solution, saturated with hydrogen chloride, of 20.8 parts of styrene in 40 parts of cyclohexane, 13 parts of gaseous nitrosyl chloride are led at −10° C. while stirring and at the same time such an amount of hydrogen chloride is led in that the reaction mixture is constantly saturated with hydrogen chloride. After the end of the reaction, the whole is stirred for another hour at −10° C. and the precipitated pale yellow colored beta-oximino-alpha-chlorethylbenzene hydrochloride is filtered off by suction rapidly and washed with a little cyclohexane. 33 parts of the melting point 71° C. are obtained, that is 80% of the theory.

The compound is very hygroscopic and not stable for long. Upon standing it changes into a black-red resin with the evolution of hydrogen chloride.

*Example 6*

Into 100 parts of ether, which have been saturated at −15° C. with hydrogen chloride, propylene is led in at −30° C. until 13 parts thereof have dissolved. Then, while stirring at −30° C., 20.3 parts of nitrosyl chloride are led in and at the same time such an amount of hydrogen chloride as is absorbed by the solution. The whole is further stirred for 3 hours and the temperature allowed to rise to 0° C. After distilling off the solvent under reduced pressure, an orange-red colored oil is obtained which contains 43.4% of chlorine.

The oil is digested with 50 parts of water, the oily layer separated and dried. In this way there are obtained 20 parts of 1-oximino-2-chlorpropane, that is 60% of the theory with reference to propylene. The analytical determination of chlorine gives the following values: Calculated: 33.0. Found: 34.0.

*Example 7*

Into a solution, saturated with hydrogen chloride, of 25 parts of a mixture of isomers of octadecylene in 50 parts of chloroform, 6.5 parts of nitrosyl chloride are led at −15° C. while stirring, and at the same time sufficient hydrogen chloride is led in to keep the reaction mixture continuously saturated with hydrogen chloride. When the reaction has ended, the whole is stirred for about one hour at −15° C. The orange-red solution is then freed from solvent by evaporation under reduced pressure. There remains a yellow colored oil permeated by crystals which, when placed in an ice box, solidifies completely in crystalline form and contains 15.2% of chlorine.

100 parts of water are added to the mass and it is shaken up with chloroform. From the chloroform layer, by removing the solvent under reduced pressure, 26 parts of alpha-chloroximino-octadecane are obtained as a yellowish oil; this is 82% of the theory with reference to octadecylene. Analysis gives the following values: Calculated: C, 68.2; H, 11.4; N, 4.4; Cl, 11.2. Found: C, 67.9; H, 11.3; N, 4.2; Cl, 11.8.

Example 8

Into a solution, saturated with hydrogen chloride, of 24 parts of cinnamyl alcohol acetate in 50 parts of chloroform, 9.1 parts of nitrosyl chloride are led at −15° C. and at the same time such an amount of hydrogen chloride that the reaction mixture continuously remains saturated with hydrogen chloride. After the end of the reaction, the mixture is stirred for another 4 hours at −15° C. and the orange colored solution is freed from solvent by evaporation under reduced pressure. There remain 33 parts of 1-phenyl-1-chlor-2-oximino-3-acetoxypropane hydrochloride as an orange-red colored oil, that is 82% of the theory with reference to cinnamyl alcohol acetate. Analytical determination of chlorine gives the following values: Calculated: 24.1. Found: 23.2.

Example 9

Into a solution, saturated with hydrogen chloride, of 20 parts of heptene-(1) in 40 parts of cyclohexane, 13.4 parts of nitrosyl chloride are led at −15° C. while stirring and at the same time sufficient hydrogen chloride to keep the reaction mixture continuously saturated with hydrogen chloride. After the end of the reaction, the whole is stirred for another 30 minutes at −15° C., then allowed to warm up to room temperature and the 1-oximino-2-chlor-heptane hydrochloride which has separated as an oily phase is separated. A part of the excess hydrogen chloride is removed in vacuo, the oil is digested with water and the water separated. The reaction product is dissolved in ether and dried with sodium sulfate. After distilling off the ether there remains 23 parts (i.e. 69% of the theory) of liquid 1-oximino-2-chlor-heptane. Analytical chlorine determination gives the following values: Calculated: 21.7%. Found: 21.9%.

What we claim is:

1. A process for the production of alpha-chloroxime hydrochlorides which comprises reacting an olefine of the general formula:

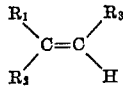

in which $R_1$, $R_2$ and $R_3$ represent members selected from the group consisting of hydrogen, alkyl radicals having 1 to 16 carbon atoms, cycloalkyl radicals having 5 to 8 carbon atoms, phenyl radical, chlorophenyl radical, acetylated hydroxy methyl radical, acetylated hydroxy ethyl radical, methyl carboxy radical, and further members wherein $R_1$ and $R_2$ taken together with the carbon atom to which they are attached and $R_1$ and $R_3$ taken together with the attached carbon atoms connected by the double bond form a cycloaliphatic ring with 5 to 8 carbon atoms as ring members, with nitrosyl chloride at a temperature of between −50° C. and +50° C. and in the presence of at least one mol hydrogen chloride per mol of the olefine, and thereafter separating the alpha-chloroxime hydrochloride thus formed from the reaction mixture.

2. A process for the production of alpha-chloroximes which comprises reacting an olefine of the formula

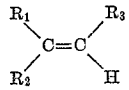

in which $R_1$, $R_2$ and $R_3$ represent members selected from the group consisting of hydrogen, alkyl radicals having 1 to 16 carbon atoms, cycloalkyl radicals having 5 to 8 carbon atoms, phenyl radical, chlorophenyl radical, acetylated hydroxy methyl radical, acetylated hydroxy ethyl radical, methyl carboxy radical and further members wherein $R_1$ and $R_2$ taken together with the carbon atom to which they are attached and $R_1$ and $R_3$ taken together with the attached carbon atoms connected by the double bond form a cycloaliphatic ring with 5 to 8 carbon atoms as ring members, with nitrosyl chloride at a temperature of between −50° C. and +50° C. and in the presence of at least one mol hydrogen chloride per mol of the olefine, separating the alpha-chloroxime hydrochloride thus formed from the reaction mixture and converting the alpha-chloroxime hydrochloride into the free alpha-chloroxime by the action of water on said alpha-chloroxime hydrochloride.

3. A process for the production of alpha-chloroxime which comprises reacting an olefine of the formula

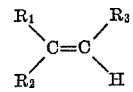

in which $R_1$, $R_2$ and $R_3$ represent members selected from the group consisting of hydrogen, alkyl radicals having 1 to 16 carbon atoms, cycloalkyl radicals having 5 to 8 carbon atoms, phenyl radical, chlorophenyl radical, acetylated hydroxy methyl radical, acetylated hydroxy ethyl radical, methyl carboxy radical and further members wherein $R_1$ and $R_2$ taken together with the carbon atom to which they are attached and $R_1$ and $R_3$ taken together with the attached carbon atoms connected by the double bond form a cycloaliphatic ring with 5 to 8 carbon atoms as ring members, with nitrosyl chloride at a temperature of between −50° C. and +50° C. and in the presence of at least one mol hydrogen chloride per mol of the olefine, separating the alpha-chloroxime hydrochloride thus formed from the reaction mixture and converting the alpha-chloroxime hydrochloride into the free alpha-chloroxime by pumping off the hydrogen chloride.

References Cited in the file of this patent

UNITED STATES PATENTS

| | | |
|---|---|---|
| 2,394,430 | Crowder et al. | Feb. 5, 1946 |
| 2,797,216 | Wagner et al. | June 25, 1957 |
| 2,890,248 | Craig | June 9, 1959 |

FOREIGN PATENTS

| | | |
|---|---|---|
| 962,532 | Germany | Apr. 25, 1957 |

OTHER REFERENCES

Tuot: Compt. rend., volume 204, pages 697–9 (1937).
Ipatieff: J. Chem. Soc., volume 78, No. I, pages 14–15 (1900).
German application, B 36753 IVb/120, Dec. 12, 1956.

UNITED STATES PATENT OFFICE
CERTIFICATE OF CORRECTION

Patent No. 3,078,306                          February 19, 1963

Otto von Schickh et al.

It is hereby certified that error appears in the above numbered patent requiring correction and that the said Letters Patent should read as corrected below.

Column 6, line 57, for "962,532" read -- 962,432 --.

Signed and sealed this 24th day of December 1963.

(SEAL)
Attest:

ERNEST W. SWIDER

Attesting Officer

EDWIN L. REYNOLDS

Acting Commissioner of Patents